Dec. 20, 1938.  F. M. BELLANCA  2,140,783
AIRPLANE CONSTRUCTION
Filed Aug. 3, 1937  3 Sheets-Sheet 1
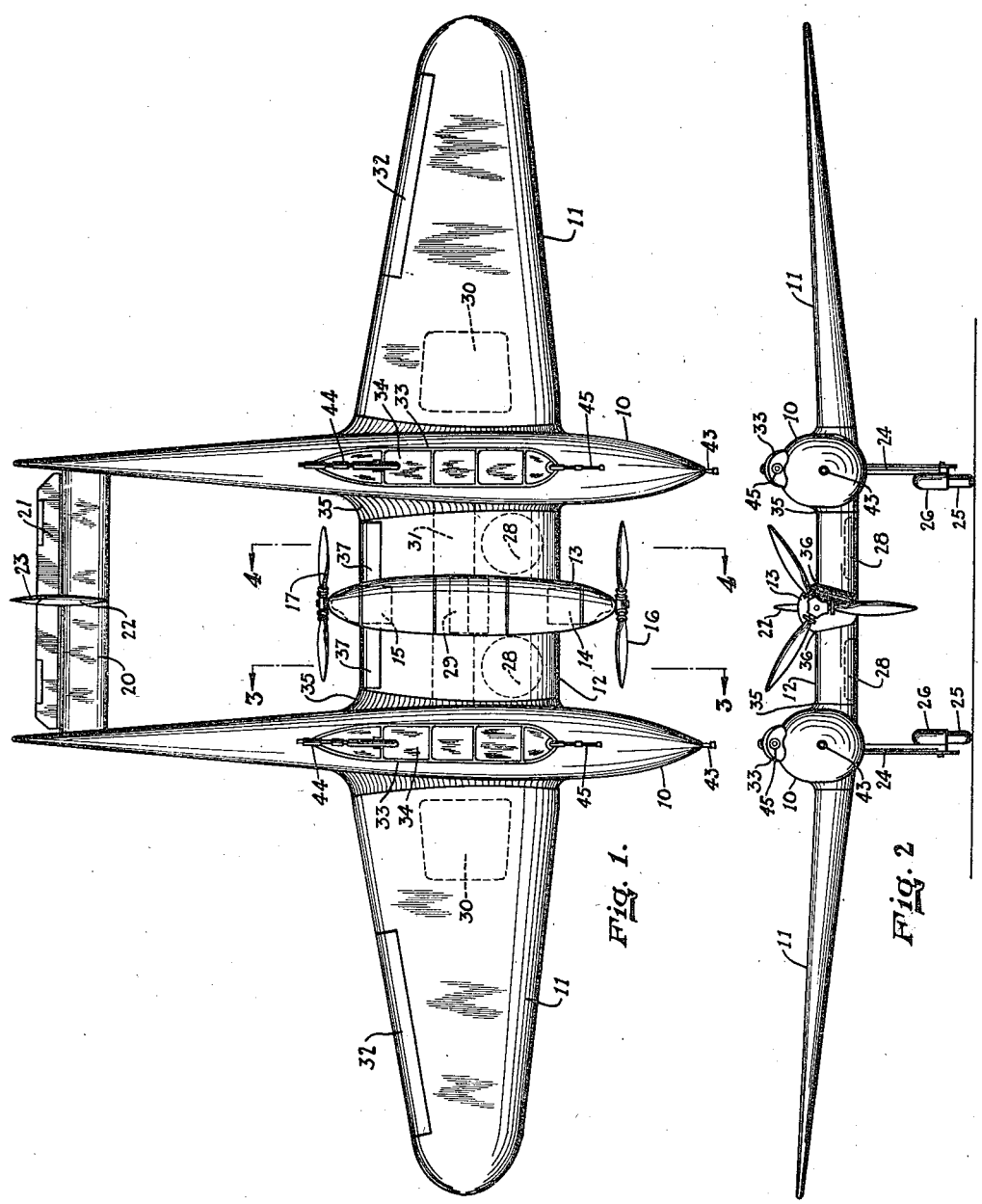
INVENTOR
FRANK M. BELLANCA
BY
ATTORNEYS Dec. 20, 1938.　　　F. M. BELLANCA　　　2,140,783
AIRPLANE CONSTRUCTION
Filed Aug. 3, 1937　　　3 Sheets-Sheet 2
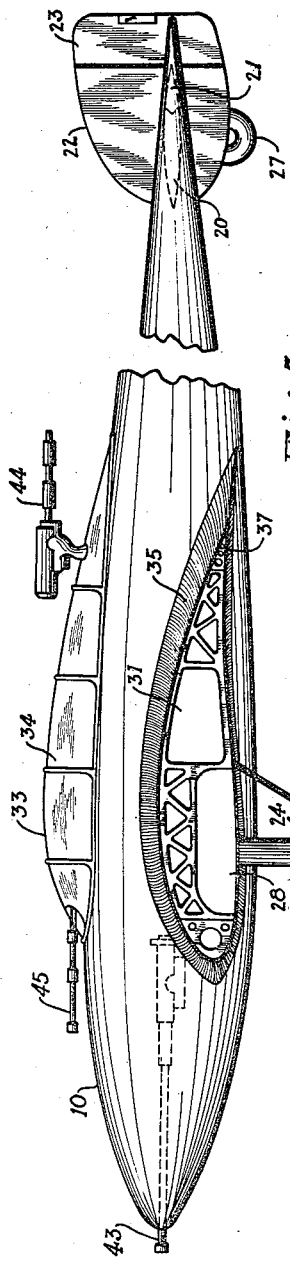
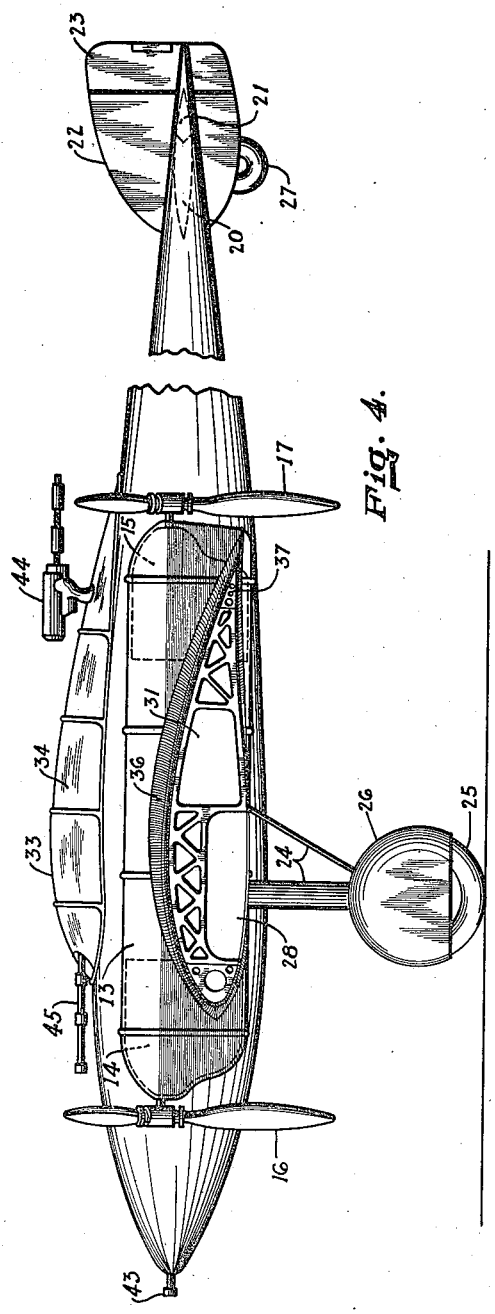
INVENTOR
FRANK M. BELLANCA
BY
Richards to Geier
ATTORNEYS Dec. 20, 1938.   F. M. BELLANCA   2,140,783
AIRPLANE CONSTRUCTION
Filed Aug. 3, 1937   3 Sheets-Sheet 3
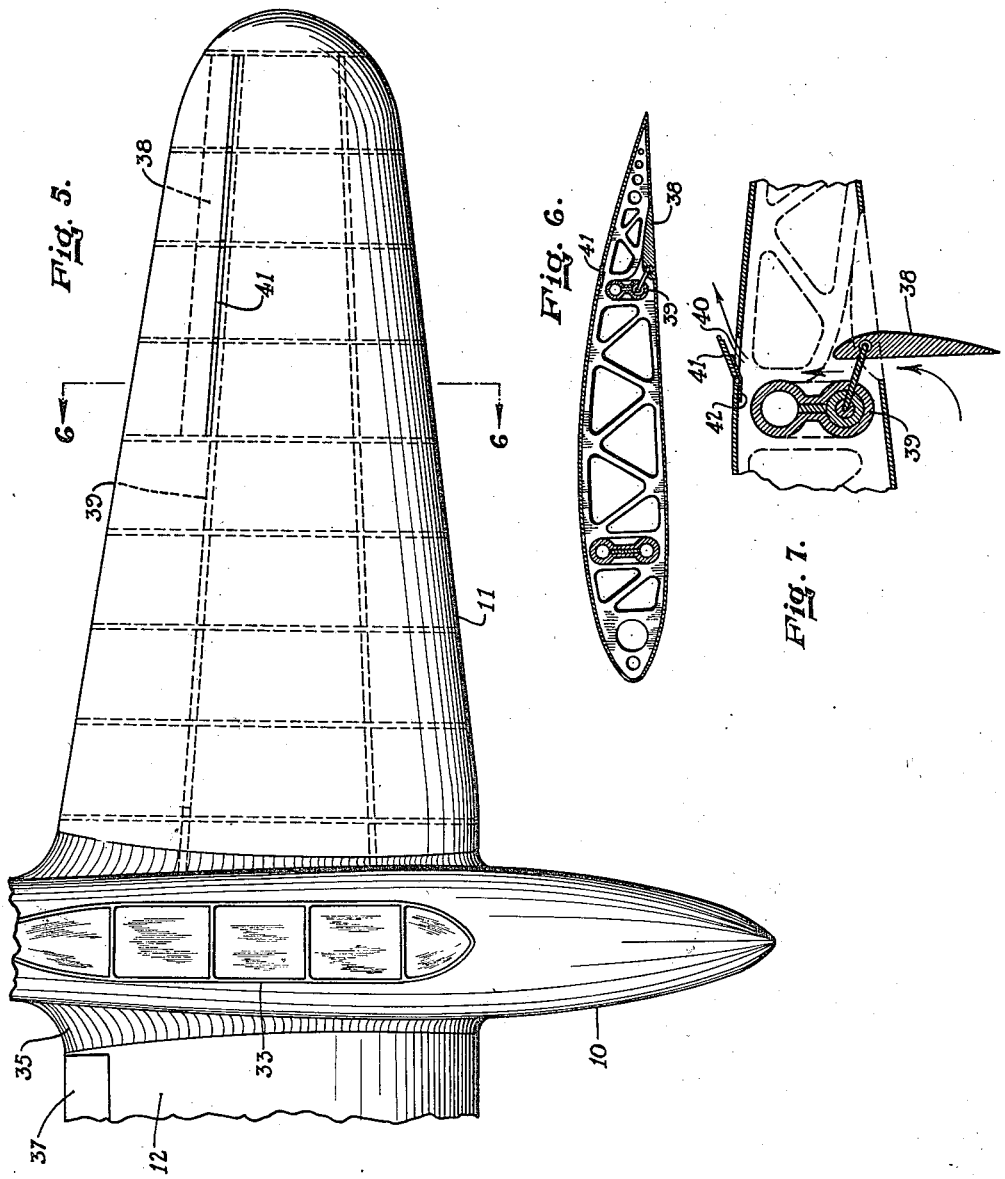
INVENTOR
FRANK M. BELLANCA
BY
ATTORNEYS Patented Dec. 20, 1938

2,140,783

UNITED STATES PATENT OFFICE 2,140,783

AIRPLANE CONSTRUCTION

Frank M. Bellanca, New York, N. Y., assignor to Miller-Bellanca Airplanes Limited, Montreal, Quebec, Canada, a corporation of Canada Application August 3, 1937, Serial No. 157,100

4 Claims. (Cl. 244—13)

The present invention relates to an airplane construction and more particularly to twin engined or multi-engined aircraft and its principal object is to attain certain aerodynamic improvements which lead to better performance and which provide greater degree of safety and comfort for the pilot and passengers.

The ideal airplane design contemplates a centralization of the three main factors in flying, namely, thrust, head resistance and lift so that all pass through the central gravity line. Although the conventional design for a multi-engined aircraft heretofore employed strives towards the accomplishment of this ideal, the goal has not been reached by far.

The center thrust, center gravity and center pressure play the most important part in flying. It is the center gravity that influences the location of the center pressure, the center thrust, the landing gear, the engines and the controls.

An ideal airplane design is one in which thrust, pressure and lift pass through or close to the central gravity line. These conditions should be closely observed in a single engined airplane.

In the orthodox twin-engined type of airplane, the static center of gravity is completely ignored and only the dynamic center of gravity considered. This obviously wrong theory has contributed towards many crashes resulting in the condemnation of the present twin-engine as an irrational and unsafe design.

The widespread opinion of the safety of twin-engined or multi-engined aircraft is borne by the fact that the flight may be sustained by a single engine in an emergency, but unfortunately this opinion does not correspond with the real facts, and a series of recent disasters have contributed towards the shattering of this general belief.

As long as two or more engines function, the thrust line passes through, or close to, the central gravity line, but as soon as one engine stops, a new line of thrust will be created and the central pressure of the fin and rudder will be at an angle with the line of central gravity.

The engine torque moment and the gyrostatic force which normally are neutralized by the opposite directional movement of the propellers and the washout of the wings become unbalanced to produce an uncontrollable factor of destruction.

All these factors so instantaneously unbalance the longitudinal and lateral stability that the airplane is forced into a terrific spin to its destruction.

Another objection to the multi-engined construction heretofore employed is the body resistance which is greatly increased by the air screw slip stream and which in turn decreases the top wing efficiency on the slip stream area.

It is now the object of the instant invention to provide an airplane construction in which the central line of thrust resistance and lift always pass through the central gravity line irrespective of whether only one or several engines are functioning.

Another object is to provide an airplane of the multiple propeller driven type in which a pusher and tractor propeller are mounted in tandem and located in the central line of symmetry of the craft.

Still another object is to provide an improved assembly and construction of the airplane wing and fuselage which will produce a Venturi action resulting in increased efficiency of the propeller, added lifting power, improved controllability and reduced body resistance and increased stub wing efficiency on the slip stream area.

A further object is to provide a wing construction which will improve the controllability of the airplane and prevent fluttering ailerons.

Further objects and advantages of the invention will become apparent from the following detailed description and accompanying drawings illustrating a preferred embodiment together with a possible modification of the invention.

In the drawings:

Figure 1 is a top plan view of an airplane embodying the invention.

Figure 2 is a front elevation.

Figure 3 represents a longitudinal section taken along the line 3—3 of Figure 1.

Figure 4 is a longitudinal section along the line 4—4 of Figure 1.

Figure 5 is a top plan view of a modified wing construction.

Figure 6 is a section along the line 6—6 of Figure 5 and

Figure 7 is a detailed view in section showing the particular aileron construction.

In the drawings the same reference characters are used to indicate the same or similar parts.

Referring more particularly to the drawings, the airplane is of the low wing monoplane type and has a pair of highly streamlined low drag fuselages 10, which are positioned in parallel, symmetrical relationship on opposite sides of the central line of gravity of the airplane. These fuselages are preferably of so-called semi-monocoque type, namely, welded or bolted tubular construction combined with clamped aluminum alloy bulkhead and skin.

The wings 11, preferably of cantilever type, tapered in plane and form, are attached to the fuselages 10. A stub wing 12 separates the two fuselages. The design and function of this stub wing will be described in more detail hereinafter.

The special streamlined nacelle 13, preferably of welded steel tube construction, is located in the stub wing 12 and merged in the general streamline design. This nacelle houses the motors 14 and 15 which rotate the propellers 16 and 17. Of these two propellers, 16 is of tractor type and 17 of the pusher type.

The main wings 11 as well as the stub wing 12 are internally braced by ribs 18 of any suitable design. The two fuselages 10 also serve as outriggers for the tail group or tail assembly which comprises a stabilizer 20 having an elevator 21 pivotally mounted on the trailing edge and a vertical fin 22 having a rudder 23 pivotally mounted on its trailing edge. The detailed construction of the tail group is of conventional design and does not form part of the invention. Its arrangement in the slip stream area, however, becomes important in view of the particular Venturi action resulting from the fuselages, stub wing and engine assembly, as will hereinafter be described.

The landing shock struts (not shown in the drawings) are pivoted to the lower end of the wing bulkheads and carry the fork 24, preferably of welded steel, for the air wheels 25, partly covered by the housing 26. A tail skid or wheel 27 is mounted along the fore and aft center of the airplane.

The landing gear is preferably of the retractable type of conventional design and when retracted the wheels are housed within the recesses 28 in the stub wing 12.

It will be understood that the instant invention is also applicable to seaplanes in which case the tail wheel may be eliminated and the landing gear substituted by pontoons of conventional construction.

Fuel tankage 29 may be provided in the nacelle 13 and additional tanks 30 may be provided in the wings. It will be understood, however, that the arrangement and location of these tanks are questions of design and do not form part of the instant invention.

A companionway 31 may be provided to permit access to the nacelle during flying, and the cowling on top of the nacelle is preferably hinged so that it can be opened up completely to permit repairs.

The ailerons 32, a modified construction of which will be described in more detail, are of the frieze type. These as well as the rudder and elevators are controlled from the cockpit 33 in the fuselages in the conventional manner. The cockpit may be provided with a slidable cover 34.

Now referring in more detail to the construction which imparts the aerodynamic improvements referred to, it will be observed that the stub wing 12 is faired with the fuselages 10 at 35 and with the nacelle 10 at 36. As previously stated the nacelle as well as the fuselages are of streamline contour tapering fore and aft, the largest bulge being approximately at the middle of the stub wing 12. Thus, a Venturi tunnel for the slip stream is formed on either side of the nacelle 13 by the two fuselages and the stub wing airfoil. The rapid rotation of the air screw imparts to the air a velocity of approximately 500 feet per second. When the air is forced back through the Venturi tunnel formed by the stub wing airfoil and the two fuselages, this velocity is converted into pressure. In this manner the front air screw will function as a turbo compressor for the rear pusher propeller giving it a firmer "bite." It has been found through experiments that the efficiency of the rear air screw by this construction has been raised approximately 12%.

It will be understood, of course, that the stub wing 12 as well as the main wing 11 has the same angle of inclination. These wings together with the two fuselages form a compact unit.

It will also be observed that the tail assembly will always be in the center of the increased pressure which will materially improve the controllability of the craft. In the construction heretofore employed there will always be a leverage between the new line of thrust and the central gravity and between the central pressure of the fin and rudder and the central gravity, as soon as the balance is disturbed by the stopping of one or more of the engines.

Furthermore, by the arrangement of both air screws working on the stub wing 12, the lifting efficiency will be greatly improved. The front screw 16 will add to the regular speed lift because of the tremendous pressure of the air screw stream. The increased efficiency of the rear propeller raises tremendously the vacuum on the upper surface of the stub wing which in turn will increase the positive pressure on the lower surface. Experience has shown that the lift efficiency by this construction has been improved approximately 15%. It will also be noted that by virtue of this construction the lift will pass through the central gravity line of the craft.

The central stub wing 12 ends at the rear with trailing edge flaps 37 which are of the conventional frieze aileron type. These flaps are operated from the pilot's seat in the conventional manner. Because of the wind tunnel effect of the stub wing, these flaps will form together with the fuselages an efficient air brake, which will cut the landing speed substantially. Thus, while the instant airplane construction has been designed to stand a speed well above 250 miles per hour, the landing speed by virtue of these air brakes may be cut to 58 miles per hour. It will be noted that the flaps when lowered together with the fuselages and the stub wing airfoil will form a pocket for the air.

In the modified wing constructions illustrated in Figures 5 to 7, the aileron 38 is located on the undersurface of the wing and hinged to the rear spar 39. It will be understood that it is controlled from the cockpit in the conventional manner. A longitudinal slot 40 is provided in the upper surface of the wing which is normally covered by the flap 41 held down by the spring 42. When the aileron is lowered to bank the craft, an air channel will be formed in the wing as shown in Figure 7 and the inrushing air will lift the flap 41 so as to permit circulation. This particular aileron construction will provide better control and prevent fluttering during flying and will also provide an additional air brake.

The constructions described hereintofore in detail lends itself to civilian as well as military flying with equal advantage. It will be observed that it provides a greater capacity for passengers. It also provides better visibility for the passengers in air transportation. As a military equipment it furnishes strategic points for machine gun installation and bomb operation. So, for instance, a machine gun 43 may be mounted in the nose of each fuselage and another machine gun 44 may be mounted in the rear upper portion of the cockpit. This machine gun arrangement provides maximum protection of the plane from all angles of attack and at the same time permits extreme effectiveness of fire from the guns. The reference character 45 represents a "sight" for the pilot.

It will be understood that various changes, substitutions and modifications in the arrangement may be resorted to without departing from the spirit and scope of the invention.

What is claimed is:

1. In an airplane the combination with a pair of spaced fuselages positioned in symmetrical relationship on opposite sides of the longitudinal axis of the plane and which axis constitutes the central line of gravity and a tail group assembly mounted between said fuselages at the rear end thereof, of means for forcibly passing the thrust, the head resistance and lift through said central line of gravity and concentrate the slipstream on said tail group assembly to increase the controllability of the plane, said means comprising a stub wing between the lower portion of said fuselages so that said fuselages project substantially above said stub wing whereby a wind tunnel is formed defined by the upper surface of said stub wing and the sides of the projecting fuselages, a tractor propeller mounted for rotation at the forward end of said stub wing and a pusher propeller mounted for rotation at the rear end of said stub wing and means for driving said propellers in opposite directions so that the torque action of the propellers will be balanced, the portion of the two fuselages at opposite sides of said stub wing being tapered fore and aft to give said wind tunnel the shape of two inverted truncated cones in section whereby the slipstream of said forward propeller is confined in a Venturilike section towards the rear to act upon said pusher propeller.

2. In an airplane the combination with a pair of spaced fuselages positioned in symmetrical relationship on opposite sides of the longitudinal axis of the plane and which axis constitutes the central line of gravity and a tail group assembly mounted between said fuselages at the rear end thereof, of means for forcibly passing the thrust, the head resistance and lift through said central line of gravity and concentrate the slip stream on said tail group assembly to increase the controllability of the plane, said means comprising a stub wing between the lower portion of said fuselages so that said fuselages project substantially above said stub wing whereby a wind tunnel is formed defined by the upper surface of said stub wing and the sides of the projecting fuselages, a tractor propeller mounted for rotation at the forward end of said stub wing, a pusher propeller mounted in rotation at the rear end of said stub wing, axially aligned with said tractor propeller, a nacelle on said stub wing projecting substantially above the upper surface thereof and positioned along said longitudinal axis dividing said wind tunnel into two parts, and motors housed within said nacelle for driving said propellers in opposite directions to balance the torque, the portion of the two fuselages at the opposite sides of said stub wing and said nacelle being tapered fore and aft whereby both parts of said wind tunnel will have the shape of two inverted truncated cones in section to confine the slipstream of the propeller in two Venturi like sections towards the rear whereby the slip stream energy is converted into pressure energy acting upon the sides of the fuselages and whereby a certain amount of said slipstream energy is recuperated.

3. In an airplane the combination with a pair of spaced fuselages positioned in symmetrical relationship on opposite sides of the longitudinal axis of the plane and which axis constitutes the central line of gravity and a tail group assembly mounted between said fuselages at the rear end thereof, of means for forcibly passing the thrust, the head resistance and lift through said central line of gravity and concentrate the slipstream on said tail group assembly to increase the controllability of the plane, said means comprising a stub wing between the lower portion of said fuselages so that said fuselages project substantially above said stub wing whereby a wind tunnel is formed defined by the upper surface of said stub wing and the sides of the projecting fuselages, a tractor propeller mounted for rotation at the forward end of said stub wing and an axially aligned oppositely rotating pusher propeller mounted for rotation at the rear end of said stub wing, a nacelle in said stub wing projecting substantially above the upper surface thereof and positioned along said longitudinal axis dividing said wind tunnel into two parts and having a motor housed therewithin to drive said propellers, the portion of the two fuselages at opposite sides of said stub wing and said nacelle being tapered fore and aft to give both of said parts of said wind tunnel the shape of two inverted truncated cones in section whereby the slipstream of the forward propeller is confined in two Venturi like sections towards the rear to act upon said rear propeller and whereby a certain amount of the slipstream energy is recuperated by converting it into pressure energy acting upon the sides of the fuselages.

4. In an airplane the combination with a pair of spaced fuselages positioned in symmetrical relationship on opposite sides of the longitudinal axis of the plane and which axis constitutes the central line of gravity and a tail group assembly mounted between said fuselages at the rear end thereof, of means for forcibly passing the thrust, the head resistance and lift through said central line of gravity and concentrate the slipstream on said tail group assembly to increase the controllability of the plane, said means comprising a stub wing between the lower portion of said fuselages so that said fuselages project substantially above said stub wing whereby a wind tunnel is formed defined by the upper surface of said stub wing and the sides of the projecting fuselages, a tractor propeller mounted for rotation at the forward end of said stub wing and an axially aligned, reversely rotating pusher propeller mounted for rotation at the rear end of said stub wing, a nacelle in said stub wing projecting substantially above the upper surface thereof and positioned along said longitudinal axis dividing said wing tunnel into two parts and having a motor housed therewithin to drive said propellers, the portion of the two fuselages at opposite sides of said stub wing and said nacelle being tapered fore and aft to give both of said parts of said wind tunnel the shape of two inverted truncated cones in section whereby the slipstream of the forward propeller is confined in two Venturi like sections towards the rear to act upon said rear propeller and whereby a certain amount of the slipstream energy is recuperated by converting it into pressure energy acting upon the sides of the fuselages, and an edge flap pivoted at the trailing end of said stub wing controlled from the pilot seat of the plane whereby an air pocket for the slipstream will be formed by the lowering of said edge flap to break the speed of the craft.

FRANK M. BELLANCA.